Patented June 17, 1952

2,600,903

UNITED STATES PATENT OFFICE 2,600,903

METHOD OF PROCESSING ALFALFA

Harry Miller, Lincoln, Nebr.

No Drawing. Application March 26, 1948,
Serial No. 17,372

9 Claims. (Cl. 99—2)

This invention relates to an improved method of processing alfalfa and similar crops to produce a number of valuable products therefrom.

Alfalfa inherently presents a number of unique advantages as an economic source of nutritional values. Inasmuch as it is a deep root plant, it is able to acquire moisture and plant food not available to other crops. The perenial character of the plant coupled with the low labor requirements for cultivation and harvesting particularly recommend it from an agronomic standpoint. These economic advantages are accentuated if inoculated seed is used, thus eliminating the necessity of applying nitrogeneous fertilizers. From the nutritional standpoint the crop is characterized not only by a high protein production per acre, but also by a high balanced mineral content and a very substantial content of important vitamins.

The potentialities of this crop as a source of nutritional values can be more readily appreciated and evaluated by comparing it for example to soybeans. Assuming a yield of 5 tons of dry hay per acre with 17% protein content, alfalfa thus represents a production of 1700 lbs. of protein per acre per year.

On the other hand a good crop of soybeans, of say 30 bushels per acre and containing 33% protein, represents a production of 594 lbs. of protein per acre per year. Thus alfalfa produces practically three times as much protein per acre as does the soy bean, the recognized outstanding protein-producing crop.

As indicated above, alfalfa products are high in mineral values of nutritional importance. As is now generally recognized, the assimilation of minerals in nutrition is most complex. In order to have nutritional value these minerals must be in proper chemical association and balance with food or feed components. This proper balance exists naturally in alfalfa. If the crop is grown on good land the mineral content is of the order of 9% and far exceeds most feed stuffs in this important nutritional factor.

Similarly, freshly processed alfalfa, as is well recognized, is high in vitamin content. While it is true that some of these vitamins, especially carotene (pro-vitamin A), lack stability, it is possible to markedly stabilize the carotenes as will be pointed out hereinafter.

At the present time these potentialities of alfalfa have not been exploited. Currently practically the only processing that has been carried out has been the dehydration of chopped alfalfa. The product thus produced has many recognized and obvious disadvantages. Thus the product is excessively bulky and has a relatively high crude fiber content. The processing as carried out does not insure any stability of important nutritional factors such as the carotenes. As a corollary of the high crude fiber content the actual protein concentration is quite low in comparison, for example, to such products as oil seed meals, tankage and fish meals.

A major object of the invention is to process alfalfa so as to fractionate or separate it into a number of different commercial products of nutritional value.

Another object is to treat alfalfa to produce therefrom a concentrate high in proteins, minerals and vitamic values and particularly useful for food and feedstuff.

A further object is to produce a dried alfalfa juice very rich in nutritional values and a dehydrated meal suitable for feed.

Yet another object of the invention is to produce from alfalfa a series of products of substantial nutritional value and a by-product in the form of a residual cellulosic fraction technologically useful in the pulp and plastic fields.

With these and other equally important and related objects in view, the invention comprehends the concept of so treating alfalfa as to concentrate its nutritional values in special segregated fractions of low bulk and low fiber content, and, optionally, to recover a commercially valuable cellulosic fraction.

The fundamental concepts of the invention will be more readily appreciated and evaluated from a consideration of a preferred process which invokes and technologically utilizes such concepts.

As will have been appreciated from the foregoing, the basic concept of the invention comprehends the idea of subjecting alfalfa to such a treatment as will insure the concentration of selected nutritional values in certain segregated fractions. As will be seen more fully hereinafter, the fractionation may be extended to any desired degree. The nature of the plant lends itself readily to a simple preliminary concentration involving essentially only relatively simple liquid-solids separation, whereby a liquid fraction enriched in nutritional proteinaceous and mineral values is separated from a solid fraction consisting largely of the cellulosic components of the plant. Each such fraction may be further processed by chemical, physicochemical, and mechanical treatments or combinations of these to produce a wide permissive range of particular products entering not only the nutritional but also industrial fields.

The potentialities of this concept will be illustrated didactically by reference to a typical method of treatment of alfalfa whereby highly valuable fractions of the original plant are produced as novel articles of commerce, presenting, particularly, high value in the food and pharmaceutical fields. The described treatment is merely illustrative of the effectuation of the broad concept of the invention. As will be appreciated, and as will be elucidated hereinafter, each of the initially segregated fractions may be further refined to produce a wide range of valuable products.

In a preferred method of treatment the alfalfa is harvested green, i. e., before the blossom stage. The harvesting may be accomplished with the equipment now available such, for example, as is used for the production of dehydrated alfalfa. In the preferred procedure according to the invention the chopper is set to cut somewhat finer than is customary and preferably to produce stem pieces that do not materially exceed one inch in length.

After the green alfalfa has been harvested and cut, it is treated as quickly as possible to express the liquid content or sap. This may be done conveniently and effectively by treating the cut alfalfa in an efficient oil expeller such, for example, as an expeller of the Anderson type. It will be appreciated that any other mechanism such as other types of continuous screw presses, opposed press rolls or equivalent mechanism which crushes the fiber and effectively expresses the sap may be utilized. As a result of such treatment there results a copious flow of raw juice comprising the liberated plant sap, which is drained off from residual fibrous material. When an expeller is employed, it is advisable to provide some means for cooling the liquid effluent. This may readily be accomplished by associating cooling means with the liquid discharge conduit from the liquid expression machine.

This simple mechanical treatment, in effect, constitutes a preliminary liquid-solids separation step with concomitant concentration of nutritional values in the separated liquid phase. When an expeller of the type described is employed, it will be found that, in ordinary circumstances, from about 40 to 45%, more or less, of the dry matter of the plant is carried off, in suspension and as highly dispersed solids, in the expressed liquid effluent.

It is particularly to be observed that this preliminarily separated raw sap liquid phase contains of the order of about 75% or more of the essential nutritional values of the plant.

The raw juice liquid phase and the residual solid phase may be separately treated in a number of ways to further enrich each fraction in one or more of the components. Such treatments may involve, for example, total concentration as by evaporation or spray drying of the liquid; selective solvent extraction of selected components of the initial liquid or solid fractions; relative segregation of the carotenes and xanthophyll esters from xanthophylls and carotenoid acids by partition of the two groups respectively between two immiscible solvents such as petroleum ether and 90% methanol. As will be appreciated the raw juice comprising the liquid expressed from the green alfalfa provides a rich source of chlorophyll, carotenoids and dietetically and therapeutically valuable minerals. Each such fraction may be relatively enriched or concentrated by utilizing effective separation methods; for example, a highly valuable mineral fraction particularly useful in pharmaceutical formulations may be produced by suitably treating the initially expressed liquid, or raw juice, or a preliminarily refined juice with ion-exchange resins to produce concentrates of the original mineral values.

The carotene content similarly may be refined to any desired degree depending upon the demands for the ultimate refined product. Thus the alpha and beta isomers may be respectively segregated by chromatographic adsorption or equivalent technique to produce a fraction relatively enriched in B- carotene and particularly valuable for pharmaceutical formulations.

In the recommended procedure the raw juice, comprising the liquid effluent from the expeller or other liquid press is treated, as rapidly as circumstances allow, so as to stabilize the vitaminic content, particularly the carotenes. This may be done in any suitable manner as for example by adding specific antioxidants which tend to protect the carotenes. It has been ascertained that a simple and effective method of substantially stabilizing the carotenes comprises adjusting the raw juice to a definite alkalinity, and preferably of the order of pH 8. As expressed, the raw juice is slightly acidic, running ordinarily about pH 6. This may be readily adjusted to the desired acidity by adding any readily available alkaline agent such as calcium oxide or hydroxide to raise the pH to from 8 to about 8.5.

After such adjustment the so-treated juice is then blanched or pasteurized by quickly bringing it to the boiling point. This or equivalent thermal treatment destroys the naturally occuring enzymes which in normal circumstances would destroy and/or inactivate the carotenes. This adjustment to alkalinity also serves to preserve the natural green color.

After such stabilization treatment the juice may be further concentrated to any desired viscosity and if desired may be reduced to a dry powder as, for example, by dehydration in a spray dryer or drum dryer.

As indicated previously, the raw juice which is expressed in the expeller contains both soluble and suspended solids, approximately in equal amounts.

If desired, before pasteurization the solids may be separated from the soluble components by any suitable procedure as, for example, by centrifuging. The thus separated fractions may then be dried. Each such dried fraction contains approximately the same amount of protein; however the water soluble vitamins are associated with the liquid fraction and the fat soluble vitamins, such as the carotenes and tocopherols, go with the suspended solids.

As indicated previously the expressed sap liquid, or raw juice, before dehydrative concentration may be treated by direct liquid-solids extraction methods to recover the fat-soluble components such as the carotenes, xanthophyll esters and folic acid as a separate commercially valuable fraction.

The residual solid matter from the expeller or other press contains substantially all of the original fiber of the plant and a minor amount of nutritional values. This may be dried and used directly as a fodder or may be fortified with feed values and then dried. It may be admixed or compounded with other valuable feed stuff to produce nutritionally balanced cattle feed.

If desired, the original solid fraction from the press or expeller may be dried and then subjected to screening, air separation or other such classification to separate it into two solid products or fractions; one consisting of a meal of reasonably good feed value and a cellulosic fraction comprising largely the stem and fiber structure of the plant. The separated fiber fraction may be used directly in the furnish of unbleached paper and fiber board, or may be digested, pulped, as, for example, in a hydro-pulper and bleached to produce a product relatively high in alpha cellulose and useful in various technical fields as, for example, for paper furnishes, plastic fillers and the like.

The utility of the process can be readily appraised by a comparison of the analysis of a product composed of dehydrated alfalfa juice as expressed in an expeller and a typical dried skim milk powder as shown in the subsequent table. The analysis of the skim milk powder chosen for evaluative comparison is taken from "Manual of Milk Products" by W. A. Stocking.

Table I

| Component | Dried Alfalfa Juice Solids | Skim Milk Powder |
|---|---|---|
| Protein per cent | 40 | 38.8 |
| Minerals do | 17 | 8.5 |
| Fat do | 5% | 0.1 to 0.5 |
| Carbohydrates do | 37 | 52 to 53 |
| Crude fiber do | 1 | 0.0 |
| Carotene | (1) | Almost nil. |
| Other vitamins | (2) | (3) |

1 250,000–500,000 U. B. P. units per lb.
2 Many in number and high in quality.
3 Few in number, low in quality.

It is apparent from the data in Table I that one of the novel products of the invention constitutes a highly valuable food product and of a balanced dietetic value considerably greater than skim milk powder and strikingly so in respect to the mineral and vitaminic components.

It will be appreciated therefore that the liquid expressed from alfalfa constitutes a valuable food product. This may be admixed, either before or after dehydration with other food values to provide a substantially completely balanced food product. For example, before dehydration the alfalfa juice may be mixed with liquid yeast concentrates such, for example, as the "solubles" produced in the grain fermentation industry, to give an ultimate dried product enriched, among other things, in the B vitamin complex provided by dried brewers' yeast. This presents a particularly valuable mixture not only because of the beneficial dietary value of the dried brewers' yeast, but also because of the stabilizing effect of such brewers' yeast on the carotenoid content and its general synergistic or potentiating action on other vitamins, particularly the tocopherols or vitamin E.

As noted hereinbefore the present invention is of profound economic significance. Utilizing alfalfa, and particularly alfalfa grown from seeds inoculated with a selected bacteria, such as *Rhizobium meliboti* to thereby increase the nitrogen fixation of the plant, it thus becomes possible to produce an extremely valuable chemurgic crop which by the process of concentration and fractionation described herein insures the production of a wide range of products high in demand in the food and certain technical industries.

While the invention has been illustratively described as utilizing alfalfa as the chemurgic source material, it will be appreciated that the principles of the invention are equally applicable to other crops, as, for example, to clover and sudan grass which similarly are characterized by a relatively high protein and vitaminic content.

It is therefore to be understood that the procedures described herein are given to illustrate typical methods of effectuating the concepts of the invention and not as limiting the useful scope of the invention within the confines of the illustrative procedures or to the particular products resulting from such procedures.

I claim:

1. A process of treating alfalfa to recover a valuable nutritional product therefrom which comprises, expressing the juice from freshly harvested alfalfa, promptly adjusting the separated juice to a definite alkalinity of the order of pH 8–pH 8.5 and recovering the treated juice.

2. A process of treating alfalfa to recover valuable products therefrom which comprises, expressing the juice from freshly harvested green alfalfa, promptly adjusting the expressed juice to a definite alkalinity of the order of pH 8–ph 8.5, subjecting the so-treated juice to a liquid-solids separation and recovering the liquid and solid components as separate fractions.

3. A process of treating alfalfa to recover valuable food products therefrom which comprises, expressing the juice from freshly harvested green alfalfa, promptly adjusting the juice to an alkaline pH, promptly heating the so-treated juice at a temperature sufficiently high to inactivate the natural enzymes and concentrating and recovering the juice.

4. A process of treating alfalfa to produce products relatively enriched in food values which comprises, expressing the raw juice from green alfalfa, promptly adjusting the raw juice to an alkaline pH, promptly heating the so-treated juice to inactivate the natural enzymes, subjecting the juice to a separation treatment to separate suspended solids from the liquid and separately recovering the said solids and liquids.

5. A process in accordance with claim 4 in which the separated liquid is evaporated to recover a dried solids concentrate enriched in food values.

6. A process in accordance with claim 4 in which each separated solid and liquid fraction is dried to produce dried solid concentrates.

7. A method of processing alfalfa which comprises, expressing the juice from freshly harvested alfala, recovering the juice and a residual press cake; adjusting the pH of the expressed juice from an acid value of the order of pH 6.5 to an alkaline value of the order of pH 8–pH 8.5, whereby to stabilize the contained carotenoids, separating the suspended solids from the alkalized juice, separately recovering a clarified juice and such solids and concentrating the clarified juice.

8. A process in accordance with claim 7 in which the press cake is dried and fractionated to produce two fractions, one comprised largely of the fibrous constituents of the cake and the other largely free of fibrous material and having substantial feed value.

9. A process in accordance with claim 8 in which the separated fibrous fraction is pulped and bleached to produce a valuable cellulosic fiber product.

HARRY MILLER.

REFERENCES CITED

The following references are of record in the file of this patent:

UNITED STATES PATENTS

| Number | Name | Date |
|---|---|---|
| 1,038,730 | Dorner | Sept. 17, 1912 |
| 1,140,638 | Walker | May 25, 1915 |
| 1,195,152 | Rich | Aug. 15, 1916 |
| 1,273,072 | Kuzmier | July 16, 1918 |
| 1,442,321 | Beckmann | Jan. 16, 1923 |
| 1,496,833 | Sherrard | June 10, 1924 |
| 1,953,607 | Holmes | Apr. 3, 1934 |
| 2,133,362 | Schnabel | Oct. 18, 1938 |
| 2,369,042 | Graham et al. | Feb. 6, 1945 |
| 2,449,143 | Pollard | Sept. 14, 1948 |
| 2,465,967 | Graham et al. | Mar. 29, 1949 |